(12) United States Patent
Tanaka et al.

(10) Patent No.: US 10,981,437 B2
(45) Date of Patent: Apr. 20, 2021

(54) WEATHER STRIP

(71) Applicant: TOYODA GOSEI CO., LTD., Kiyosu (JP)

(72) Inventors: Mitsue Tanaka, Kiyosu (JP); Hidekazu Kurimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 119 days.

(21) Appl. No.: 16/072,916

(22) PCT Filed: Feb. 23, 2017

(86) PCT No.: PCT/JP2017/006804
§ 371 (c)(1),
(2) Date: Jul. 26, 2018

(87) PCT Pub. No.: WO2017/169359
PCT Pub. Date: Oct. 5, 2017

(65) Prior Publication Data
US 2019/0061501 A1 Feb. 28, 2019

(30) Foreign Application Priority Data
Mar. 31, 2016 (JP) .............................. JP2016-069923

(51) Int. Cl.
*B60J 10/15* (2016.01)
*C08L 23/16* (2006.01)
(Continued)

(52) U.S. Cl.
CPC .............. *B60J 10/15* (2016.02); *B60J 10/16* (2016.02); *B60J 10/24* (2016.02); *C08K 3/04* (2013.01);
(Continued)

(58) Field of Classification Search
CPC .............. C08L 23/16; C08L 2205/025; C08L 2205/03; C08K 3/04; B60J 10/15
See application file for complete search history.

(56) References Cited

U.S. PATENT DOCUMENTS

| 5,100,733 A | 3/1992 | Yoshida et al. |
| 8,205,391 B2 * | 6/2012 | Aritake .................... B60J 10/16 49/498.1 |

(Continued)

FOREIGN PATENT DOCUMENTS

| JP | H08-143784 A | 6/1996 |
| JP | 2610165 B2 | 5/1997 |

(Continued)

OTHER PUBLICATIONS

JP-2012219119-A, Nov. 2012, Machine Translation (Year: 2012).*
(Continued)

*Primary Examiner* — Satya B Sastri
(74) *Attorney, Agent, or Firm* — Posz Law Group, PLC

(57) ABSTRACT

A weather strip includes an ethylene-α-olefin-nonconjugated diene copolymer rubber composition having a volume resistivity of no less than 1.0E+6 Ω·cm and having a specific gravity of less than 1.30, the rubber composition including: carbon black in an amount of 40 parts by mass to 140 parts by mass; and at least one polymer having a specific gravity of no more than 1.8 and an ethylene content of no more than 70 wt % and at least one polymer having a specific gravity of no more than 1.8 and an ethylene content of no less than 70 wt % in a collective amount of 5 parts by mass to 50 parts by mass, per 100 parts by mass of an EPDM polymer. At least a mount base of the weather strip, which is to be mounted to a car body, is formed of the rubber composition.

4 Claims, 1 Drawing Sheet

(51) Int. Cl.
*B60J 10/16* (2016.01)
*C08K 3/04* (2006.01)
*B60J 10/24* (2016.01)

(52) U.S. Cl.
CPC ......... *C08L 23/16* (2013.01); *C08L 2205/025* (2013.01); *C08L 2205/03* (2013.01)

(56) References Cited

U.S. PATENT DOCUMENTS

| | | |
|---|---|---|
| 2003/0059637 A1 | 3/2003 | Imai et al. |
| 2009/0239014 A1* | 9/2009 | Noguchi ................ C08L 23/16 428/36.8 |
| 2010/0317758 A1 | 12/2010 | Okuda et al. |

FOREIGN PATENT DOCUMENTS

| | | | |
|---|---|---|---|
| JP | 10024477 A | * | 1/1998 |
| JP | 2003-147133 A | | 5/2003 |
| JP | 2003-155386 A | | 5/2003 |
| JP | 2003155386 A | * | 5/2003 |
| JP | 2005-041986 A | | 2/2005 |
| JP | 2007-169527 A | | 7/2007 |
| JP | 2011-016978 A | | 1/2011 |
| JP | 2012-219119 A | | 11/2012 |
| JP | 2012219119 A | * | 11/2012 |
| JP | 2014-181266 A | | 9/2014 |

OTHER PUBLICATIONS

JP-2003155386-A, May 2003 (Year: 2003).*
JP-10024477-A, Jan. 1998, Derwent AB. (Year: 1998).*
International Search Report of the International Searching Authority dated Apr. 18, 2017 for the corresponding international application No. PCT/JP2017/006804 (and English translation).
International Preliminary Report on Patentability dated Oct. 11, 2018 issued in corresponding international patent application No. PCT/JP2017/006804 (and English translation thereof).

\* cited by examiner

WEATHER STRIP

CROSS REFERENCE TO RELATED APPLICATIONS

This application is a U.S. national stage of International Application No. PCT/JP2017/006804 filed on Feb. 23, 2017 and is based on Japanese Patent Application No. 2016-069923 filed on Mar. 31, 2016, the contents of which are incorporated herein by reference.

TECHNICAL FIELD

The present invention relates to a weather strip.

BACKGROUND

It is known that galvanic corrosion occurs on a portion of a steel plate of a car body to which a weather strip is mounted and results in rusting. This is because rubber materials used for weather strips contain a large amount of carbon black, which readily allows electric current to flow. The rubber material of the weather strip, which is mounted to and in contact with a fitted portion of a steel plate, is electrochemically more noble than steel. Upon contacting conductive liquid such as rain or rinse water, the interface between the rubber material and steel acts as a local cell, and the electric current flowing therein ionizes the steel, which is less noble than the rubber material, resulting in oxidation and dissolution of steel.

Increasing demands for a lighter car body for fuel efficiency cause more car manufacturers to use lighter metals such as aluminum alloy instead of conventionally used steel for car bodies. However, aluminum is less noble than steel and thus more prone to galvanic corrosion than steel, which inevitably arouses concerns about galvanic corrosion on the fitted portion in contact with the weather strip.

To eliminate these concerns, weather strips that can prevent galvanic corrosion are required. Patent Document 1 describes a weather strip formed of an ethylene propylene rubber. Although carbon black-containing rubber members having surface electric resistivity of 1.0E+4 to 1.0E+5 Ω·cm are widely used, Patent Document 1 describes a rubber member containing less carbon black and having surface electric resistivity of no less than 1.0E+6 Ω·cm, which can substantially prevent rusting on an aluminum alloy member.

Patent Document 2 describes an ethylene-α-olefin-nonconjugated diene copolymer rubber composition containing carbon black that has a relatively low surface electric resistivity of 1.0E+4 to 1.0E+6 Ω·cm. Despite such a relatively low surface electric resistivity, the rubber composition can form a weather strip that will not corrode aluminum alloy for a long time. This is achieved by kneading the rubber composition in an unvulcanized state until it obtains a viscoelasticity having a complex modulus that changes at a certain rate or higher. The complex modulus is an index of viscoelasticity of unvulcanized rubber.

Patent Document 3 describes a technique of including white fillers as well as carbon black in an ethylene propylene rubber as reinforcing agents to make a weather strip. White fillers are added to reduce luster of the black rubber including carbon black, not to prevent galvanic corrosion described above.

PATENT DOCUMENTS

Patent Document 1: Japanese Patent No. 2610165
Patent Document 2: Japanese Patent Application Publication No. 2005-41986
Patent Document 3: Japanese Patent Application Publication No. H08-143784

SUMMARY

Adding a smaller amount of carbon black as a reinforcing agent, as described in Patent Document 1, leads to a smaller reinforcement effect, thereby causing problems such as degradation of extruded surface of the weather strip and noticeable contraction after extrusion.

The inventors of the present invention have focused on the method of reducing luster described in Patent Document 3 that eventually affects conductivity of the weather strip. The inventors have studied a method of increasing electrical resistance of the weather strip by reducing the amount of carbon black and adding insulating white fillers.

Although the inventors have observed increased electrical resistance by adding white fillers such as silicon oxide, calcium carbonate, talc, and clay, which are widely used fillers, such white fillers have a higher specific gravity than other materials to be compounded with rubber (e.g., specific gravity of carbon black is 1.8 to 2.1, whereas specific gravity of calcium carbonate is 2.7 to 2.9). This increases the specific gravity of the rubber composition and consequently increases the weight of the weather strip, which fails to meet the requirements for a lighter car body.

It is an object of the present invention to provide a weather strip that has a high electrical resistance to prevent galvanic corrosion on a car body and has a lower specific gravity to reduce weight.

The weather strip according to the present invention is characterized by including a rubber composition having a volume resistivity of no less than 1.0E+6 Ω·cm and having a specific gravity of less than 1.30, the rubber composition including: carbon black in an amount of 40 parts by mass to 140 parts by mass; and at least one polymer having a specific gravity of no more than 1.8 and an ethylene content of no more than 70 wt % and at least one polymer having a specific gravity of no more than 1.8 and an ethylene content of no less than 70 wt % in a collective amount of 5 parts by mass to 50 parts by mass, per 100 parts by mass of ethylene-α-olefin-nonconjugated diene copolymer.

The polymer having a specific gravity of no more than 1.8 and an ethylene content of no more than 70 wt % and the polymer having a specific gravity of no more than 1.8 and an ethylene content of no less than 70 wt % are each included in an amount of no less than 0.5 part by mass.

At least a mount base of the weather strip, which is to be mounted to a car body, is preferably formed of the rubber composition.

The polymer having a specific gravity of no more than 1.8 and an ethylene content of no more than 70 wt % is preferably an ethylene propylene rubber.

The polymer having a specific gravity of no more than 1.8 and an ethylene content of no less than 70 wt % is preferably a polyolefin elastomer.

According to the present invention, the volume resistivity of no less than 1.0E+6 Ω·cm of the ethylene-α-olefin-nonconjugated diene copolymer rubber composition can prevent galvanic corrosion on a car body and the specific gravity of less than 1.30 of the rubber composition can achieve a light weather strip. Although the upper limit of the volume resistivity is not limited, it may be, for example, 1.0E+15 Ω·cm. Although the lower limit of the specific gravity is not limited, it may be, for example, 0.80.

The rubber composition includes at least one polymer having a specific gravity of no more than 1.8 and an ethylene content of no more than 70 wt % and at least one polymer having a specific gravity of no more than 1.8 and an ethylene content of no less than 70 wt % each in an amount of no less than 0.5 part by mass, and in a collective amount of 5 parts by mass to 50 parts by mass. If the rubber composition only includes a polymer having an ethylene content of no more than 70 wt %, the rubber composition lacks strength in its unvulcanized state. Without a sufficient strength in an unvulcanized state, in a sheeting/stripping process in which the kneaded rubber dough is formed and cut into a strip to facilitate feeding of the unvulcanized rubber composition into an extruder or in a cooling process after the sheeting/stripping process, in which the strip of rubber dough is cooled, the strip of the rubber dough may tear. If the rubber composition only includes a polymer having an ethylene content of no less than 70 wt %, the rubber composition lacks extensibility in an unvulcanized state.

In this regard, the rubber composition includes at least one polymer having a specific gravity of no more than 1.8 and an ethylene content of no more than 70 wt % and at least one polymer having a specific gravity of no more than 1.8 and an ethylene content of no less than 70 wt % in a collective amount of 5 parts by mass to 50 parts by mass, thereby obtaining sufficient strength and extensibility even in an unvulcanized state. The polymer having an ethylene content of no more than 70 wt % and the polymer having an ethylene content of no less than 70 wt % both have a specific gravity of no more than 1.8. This configuration can achieve a lower specific gravity of the weather strip formed of this rubber composition, thereby achieving a lighter weather strip.

The components of the present invention and the details thereof will be described below.

1. Ethylene-α-olefin-nonconjugated diene Copolymer (hereinafter referred to as "EPDM")

Examples of α-olefins include, but not limited to, propylene, 1-butene, 1-pentene, 1-hexene, 4-methyl-1-pentene, 1-octene, and 1-decene. Of the examples above, propylene is preferred.

Examples of nonconjugated dienes include, but not limited to, 1,4-hexadiene, dicyclopentadiene, and 5-ethylidene-2-norbornene.

2. Carbon Black

Any generally known carbon black, such as commercially available products, may be used as appropriate. Examples of carbon black include, but not limited to, SRF, GPF, FEF, MAF, HAF, ISAF, SAF, FT, and MT.

3. Polymer

Any generally known polymers, such as commercially available polymers, may be used as appropriate. Examples of polymers having a specific gravity of no more than 1.8 and an ethylene content of no more than 70 wt % include, but not limited to, EPM and EPDM. Of the examples above, an ethylene propylene rubber having no cross-linking sites is preferred.

The polymer having a specific gravity of no more than 1.8 and an ethylene content of no less than 70 wt % is not particularly limited, and any generally known polymers (commercially available polymers) may be used as appropriate. Among them, polyolefin elastomers are preferred. Examples of polyolefin elastomers include ethylene α-olefin copolymers (e.g., ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, ethylene-1-butene-1-octene copolymer).

4. Weather Strip

Examples of the weather strip include, but not limited to, weather strips that can be mounted to an opening portion in a car body or to a window frame.

The mount base of the weather strip mounted to the car body is not particularly limited, and may be, for example, a trimmed portion having a substantially c-shaped cross section or substantially u-shaped cross section.

The weather strip according to the present invention can prevent galvanic corrosion on the car body with an increased electrical resistance and also achieve a lighter weight with a lowered specific gravity.

DETAILED DESCRIPTION

Provided is a weather strip in which at least the mount base of the weather strip to a car body is formed of an ethylene-α-olefin-nonconjugated diene copolymer rubber composition having a volume resistivity of no less than 1.0E+6 Ω·cm and having a specific gravity of less than 1.30, the rubber composition including carbon black in an amount of 40 parts by mass to 140 parts by mass and a polymer having an ethylene content of no more than 70 wt % and a polymer having an ethylene content of no less than 70 wt % in a collective amount of 5 parts by mass to 50 parts by mass per 100 parts by mass of an EPDM polymer.

EXAMPLES

Figure 1A:
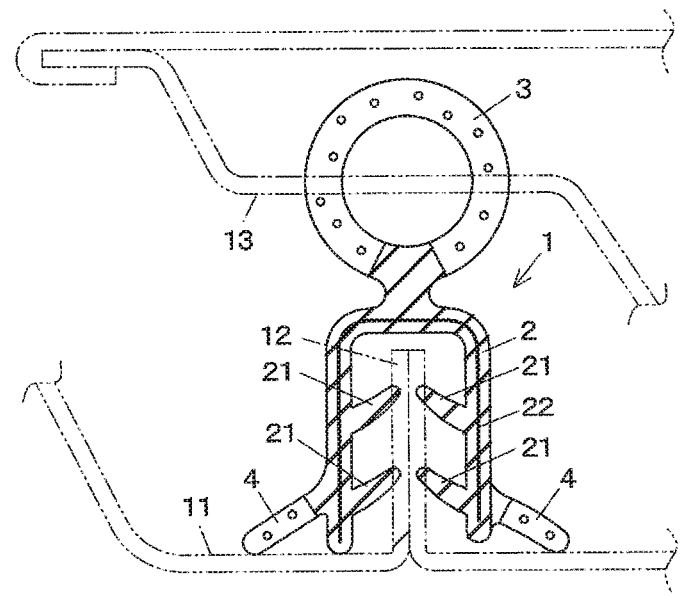
FIGS. 1A and 1B are cross-sectional views of weather strips according to examples.
Figure 1B:
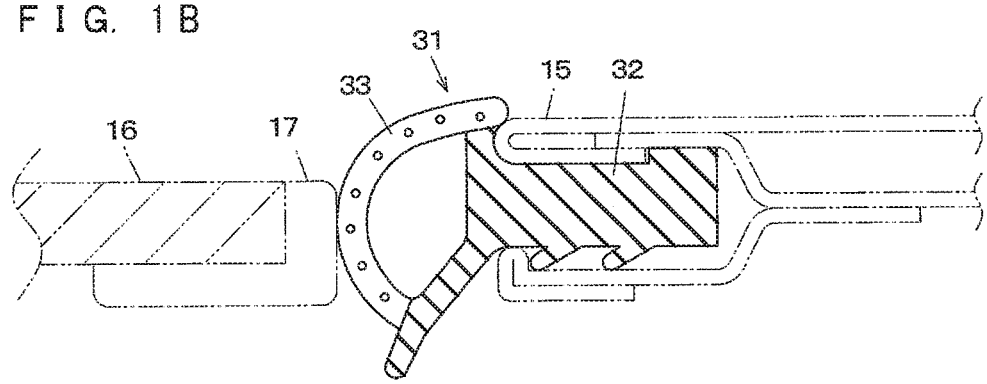

An example illustrated in FIG. 1A is a weather strip 1 to be mounted to a flange 12 that is a portion of a trunk opening periphery 11 of an automobile to which the weather-strip is to be fitted. An example illustrated in FIG. 1B is a weather strip 31 to be mounted to a channel portion 15 that is a portion of a roof of an automobile to which the weather trip is to be fitted.

The formulations of EPDM rubber compositions of examples created to be used for the examples above and the formulations of EPDM rubber compositions of comparative examples are illustrated in Table 1, Table 2, and Table 3.

TABLE 1

| Raw Material | Trade name | Example 1 | Example 2 | Example 3 | Comparative example 1-1 | Comparative example 1-2 |
| --- | --- | --- | --- | --- | --- | --- |
| EPDM | NORDEL IP 4570 | 100 | 100 | 100 | 100 | 100 |
| Carbon | Asahi #60UGS | 95 | 95 | 95 | 95 | 95 |
| Oil | Diana Process Oil PS-380 | 82 | 82 | 82 | 82 | 82 |
| Calcium carbonate | Whiton B | 29.1 | 29.1 | 29.1 | 38.4 | 29.1 |

TABLE 1-continued

| Raw Material | Trade name | | | | | |
|---|---|---|---|---|---|---|
| Kaolin | CROWNCLAY | 48.9 | 48.9 | 48.9 | 63.3 | 48.9 |
| Polymer a | EP11 | 10 | 20 | 30 | 15 | 40 |
| Polymer b | ENGAGE 8480 | 30 | 20 | 10 | | |
| Zinc oxide | META-Z 102 | 4 | 4 | 4 | 4 | 4 |
| Stearic acid | LUNAC S-50V | 2.8 | 2.8 | 2.8 | 2.8 | 2.8 |
| Formability enhancer | PEG 4000S | 1.1 | 1.1 | 1.1 | 1.1 | 1.1 |
| Defoamer | CML#31 | 5 | 5 | 5 | 5 | 5 |
| Vulcanizing agent | Powdery sulfur | 1.7 | 1.7 | 1.7 | 1.7 | 1.7 |
| Vulcanization accelerator | *1 | 2.8 | 2.8 | 2.8 | 2.8 | 2.8 |
| Material Physical Properties | Volume resistivity [Ω·cm] | 5.7E+06 | 6.1E+06 | 6.4E+06 | 1.3E+04 | 7.3E+06 |
| | Specific gravity | 1.19 | 1.19 | 1.19 | 1.25 | 1.19 |
| Workability | Tears of rubber strip | ○ | ○ | ○ | Δ | X |

| Raw Material | Trade name | Comparative example 2-1 | Comparative example 2-2 | Comparative example 3 | Comparative example 4 |
|---|---|---|---|---|---|
| EPDM | NORDEL IP 4570 | 100 | 100 | 100 | 100 |
| Carbon | Asahi #60UGS | 95 | 95 | 158 | 95 |
| Oil | Diana Process Oil PS-380 | 82 | 82 | 89 | 82 |
| Calcium carbonate | Whiton B | 38.4 | 29.1 | 50 | 44 |
| Kaolin | CROWNCLAY | 63.3 | 48.9 | | 74 |
| Polymer a | EP11 | | | | |
| Polymer b | ENGAGE 8480 | 15 | 40 | | |
| Zinc oxide | META-Z 102 | 4 | 4 | 4 | 4 |
| Stearic acid | LUNAC S-50V | 2.8 | 2.8 | 2.8 | 2.8 |
| Formability enhancer | PEG 4000S | 1.1 | 1.1 | 1.1 | 1.1 |
| Defoamer | CML#31 | 5 | 5 | 4 | 5 |
| Vulcanizing agent | Powdery sulfur | 1.7 | 1.7 | 1.7 | 1.7 |
| Vulcanization accelerator | *1 | 2.8 | 2.8 | 2.8 | 2.8 |
| Material Physical Properties | Volume resistivity [Ω·cm] | 2.4E+06 | 5.0E+06 | 3.2E+04 | 1.0E+06 |
| | Specific gravity | 1.25 | 1.19 | 1.25 | 1.30 |
| Workability | Tears of rubber strip | X | X | ○ | ○ |

*1: Vulcanization accelerator: a mixture of "RHENOCURE NPV/C", "NOCCELER BZ", "NOCCELER M" and "NOCCELER TT"

TABLE 2

| Raw Material | Trade name | Example 4 | Example 5 | Example 6 | Example 7 | Example 8 |
|---|---|---|---|---|---|---|
| EPDM | NORDEL IP 4570 | 100 | 100 | 100 | 100 | 100 |
| Carbon | Asahi #60UGS | 95 | 95 | 95 | 95 | 95 |
| Oil | Diana Process Oil PS-380 | 82 | 82 | 82 | 82 | 82 |
| Calcium carbonate | Whiton B | 29.1 | 29.1 | 29.1 | 29.1 | 29.1 |
| Kaolin | CROWNCLAY | 48.9 | 48.9 | 48.9 | 48.9 | 48.9 |
| Polymer a | EP11 | 10 | 20 | 30 | 35 | 38 |
| Polymer b | ENGAGE 8480 | 30 | 20 | 10 | 5 | 2 |
| Zinc oxide | META-Z 102 | 6 | 6 | 6 | 6 | 6 |
| Stearic acid | LUNAC S-50V | 2.8 | 2.8 | 2.8 | 2.8 | 2.8 |
| Formability enhancer | PEG 4000S | 1.1 | 1.1 | 1.1 | 1.1 | 1.1 |
| Defoamer | CML#31 | 9 | 9 | 9 | 9 | 9 |
| Vulcanizing agent | Powdery sulfur | 1.7 | 1.7 | 1.7 | 1.7 | 1.7 |
| Vulcanization accelerator | *1 | 2.8 | 2.8 | 2.8 | 2.8 | 2.8 |
| Material Physical Properties | Volume resistivity [Ω·cm] | 7.5E+06 | 6.1E+06 | 6.4E+06 | 6.6E+06 | 6.6E+06 |
| | Specific gravity | 1.20 | 1.20 | 1.20 | 1.20 | 1.20 |
| Workability | Tears of rubber strip | ○ | ○ | ○ | ○ | ○ |

TABLE 2-continued

| Raw Material | Trade name | Comparative example 5 | Comparative example 6 | Comparative example 7 |
|---|---|---|---|---|
| EPDM | NORDEL IP 4570 | 100 | 100 | 100 |
| Carbon | Asahi #60UGS | 95 | 95 | 95 |
| Oil | Diana Process Oil PS-380 | 82 | 82 | 82 |
| Calcium carbonate | Whiton B | 29.1 | 29.1 | 44 |
| Kaolin | CROWNCLAY | 48.9 | 48.9 | 74 |
| Polymer a | EP11 | 40 | | |
| Polymer b | ENGAGE 8480 | | 40 | |
| Zinc oxide | META-Z 102 | 6 | 6 | 6 |
| Stearic acid | LUNAC S-50V | 2.8 | 2.8 | 2.8 |
| Formability enhancer | PEG 4000S | 1.1 | 1.1 | 1.1 |
| Defoamer | CML#31 | 9 | 9 | 9 |
| Vulcanizing agent | Powdery sulfur | 1.7 | 1.7 | 1.7 |
| Vulcanization accelerator | *1 | 2.8 | 2.8 | 2.8 |
| Material Physical Properties | Volume resistivity [Ω·cm] | 5.0E+0 6 | 5.7E+06 | 1.0E+06 |
| | Specific gravity | 1.20 | 1.20 | 1.32 |
| Workability | Tears of rubber strip | X | X | ○ |

*1: Vulcanization accelerator: a mixture of "RHENOCURE NPV/C", "NOCCELER BZ", "NOCCELER M" and "NOCCELER TT"

TABLE 3

| Raw Material | Trade name | Example 9 | Example 10 | Example 11 | Example 12 | Comparative example 8 | Comparative example 9 |
|---|---|---|---|---|---|---|---|
| EPDM | NORDEL IP 4570 | 100 | 100 | 100 | 100 | 100 | 100 |
| Carbon | Asahi #60UGS | 95 | 95 | 95 | 95 | 95 | 95 |
| Oil | Diana Process Oil PS-380 | 72 | 72 | 72 | 72 | 72 | 72 |
| Calcium carbonate | Whiton B | 34.6 | 33.1 | 39.1 | 44.3 | 34.6 | 34.6 |
| Kaolin | CROWNCLAY | 58.4 | 58.4 | 65.9 | 74.7 | 58.4 | 58.4 |
| Polymer a | EP11 | 20 | 22 | 10 | 5 | 40 | |
| Polymer b | ENGAGE 8480 | 20 | 22 | 10 | 5 | | 40 |
| Zinc oxide | META-Z 102 | 4 | 4 | 4 | 4 | 4 | 4 |
| Stearic acid | LUNAC S-50V | 2.8 | 2.8 | 2.8 | 2.8 | 2.8 | 2.8 |
| Formability enhancer | PEG 4000S | 1.1 | 1.1 | 1.1 | 1.1 | 1.1 | 1.1 |
| Defoamer | CML#31 | 5 | 5 | 5 | 5 | 5 | 5 |
| Vulcanizing agent | Powdery sulfur | 1.7 | 1.7 | 1.7 | 1.7 | 1.7 | 1.7 |
| Vulcanization accelerator | *1 | 2.8 | 2.8 | 2.8 | 2.8 | 2.8 | 2.8 |
| Material Physical Properties | Volume resistivity [Ω·cm] | 5.8E+06 | 7.2E+06 | 4.5E+06 | 2.3E+06 | 5.2E+0 6 | 5.6E+06 |
| | Specific gravity | 1.21 | 1.20 | 1.26 | 1.29 | 1.21 | 1.21 |
| Workability | Tears of rubber strip | ○ | ○ | ○ | ○ | X | X |

*1: Vulcanization accelerator: a mixture of "RHENOCURE NPV/C", "NOCCELER BZ", "NOCCELER M" and "NOCCELER TT"

The following products were used for the materials illustrated in Table 1, Table 2, and Table 3.

The EPDM: "NORDEL IP 4570", trade name of Dow Chemical Japan Ltd.

The carbon black: "Asahi #60", trade name, of Asahi Carbon Co., Ltd.

The plasticizer: "Diana Process Oil PS-380", trade name, of Idemitsu Kosan Co., Ltd.

The calcium carbonate: "Whiton B" (specific gravity of 2.7), trade name, of Bihoku Funka Kogyo Co., Ltd.

The kaolin clay serving as white, functional filler: "CROWNCLAY", trade name, of Active Minerals International LLC.

Polymer a: "JSR EP11" (ethylene content of 52 wt %, specific gravity of 0.86), trade name of an ethylene propylene rubber product of JSR Corporation.

Polymer b: "ENGAGE 8480" (ethylene content of 77 wt %, specific gravity of 0.904), trade name of a polyolefin elastomer product of Dow Chemical Japan Ltd.

The zinc oxide: "META-Z 102", trade name, of Inoue Calcium Corporation.

The stearic acid: "LUNAC S-50V", trade name, of Kao Corporation.

The formability enhancer: "PEG 4000S", trade name, of Sanyo Chemical Industries, Ltd.

The defoamer: "CML#31", trade name, of Ohmi Chemical Industry Co., Ltd.

The powdery sulfur serving as a vulcanizing agent: "fine sulfur powder 325 mesh", trade name, of Hosoi Chemical Industry Co., Ltd.

The vulcanization accelerator: a mixture of "RHENOCURE NPV/C", trade name, of Rhein Chemie Japan Ltd., and "NOCCELER BZ", "NOCCELER M", and "NOCCELER TT", trade names, of Ouchi Shinko Chemical Industrial Co., Ltd.

In examples 1 to 3, different formulation ratios of polymer a and polymer b were used.

In examples 4 to 6, the amounts of zinc oxide and defoamer were increased compared to those in examples 1 to 3.

In examples 7 and 8, a different formulation ratio of polymer a and polymer b was used from that in example 6.

In example 9, the amount of plasticizer (oil) was reduced and the amounts of calcium carbonate and kaolin clay were increased compared to those in example 2.

In examples 10 to 12, a different formulation ratio of polymer a and polymer b was used from that in example 9.

The EPDM rubber compositions of examples and comparative examples were kneaded by a kneader and then subjected to vulcanizing process at 170° C. for ten minutes, and specimens were thus created. The volume resistivity and the specific gravity of the specimens were measured in accordance with JIS K 6911 and JIS K 6268, respectively. The rubber compositions formed into a strip shape were examined to determine whether the rubber strips had tears after the sheeting/stripping process (open-roll) and the cooling process (batch-off) in the rubber kneading process. A rubber strip with no tear after the sheeting/stripping process and the cooling process was rated "good (○)". When the rubber strip was torn in one of the sheeting/stripping process and cooling process, it was rated "fair (Δ)". When the rubber strip was torn in both the sheeting/stripping process and the cooling process, it was rated "poor (x)". The results are shown in Table 1, Table 2, and Table 3.

The rubber compositions of examples 1 to 12 had a volume resistivity of no less than 1.0E+6 Ω·cm and a specific gravity of less than 1.30, and were all rated good in terms of tears of the strip.

The rubber compositions of comparative examples 1-1, 1-2, 2-1, 2-2, 5, 6, 8, and 9 were torn because the rubber compositions included a single species of polymer.

The rubber composition of comparative example 3 had a volume resistivity of 3.2E+4 Ω·cm. This is believed to be due to a lack of kaolin clay, polymer a, and polymer b.

The rubber composition of comparative example 4 had a specific gravity of 1.30, and the rubber composition of comparative example 7 had a specific gravity of 1.32. These relatively high specific gravities are believed to be due to an increased amount of kaolin clay.

The weather strips illustrated in FIGS. 1A and 1B were manufactured with the rubber compositions of examples 1 to 12.

The weather strip 1 illustrated in FIG. 1A that is to be mounted to a trunk opening has a trimmed portion 2 that is a mount base having a substantially c-shaped cross section and is to be mounted to the flange 12 made of a steel plate or an aluminum alloy plate, a hollow sealing portion 3 that has a hollow shape and is to be in contact with a trunk lid 13 for sealing the gap therebetween, and sealing lips 4 that are to be in contact with a trunk opening periphery surface 11 for sealing the gap therebetween. In the trimmed portion 2, a vehicle outer side wall, a vehicle inner side wall, and a bottom wall form the substantially c-shaped cross section. Flange retaining lips 21 project from the inner surfaces of the vehicle outer side wall and the vehicle inner side wall. Inside the trimmed portion 2, an insert 22 made of a sheet metal or resin is embedded for reinforcement. The sealing lips 4 project from the outer surfaces of the vehicle outer side wall and the vehicle inner side wall.

The trimmed portion 2 and the flange retaining lips 21 (hatched area) are formed of an EPDM rubber composition of examples 1 to 12, and the hollow sealing portion 3 and the sealing lips 4 are formed of a sponge rubber composition. The EPDM rubber composition and the sponge rubber composition are co-extruded to form the weather strip 1.

Pushing the trimmed portion 2 downward onto the flange 12 to insert the flange 12 into the inner portion having the substantially c-shaped cross section causes the flange retaining lips 21 to retain the flange 12, and thus the weather strip 1 can be mounted to the flange 12. The trimmed portion 2 and the flange retaining lips 21, both to be in contact with the flange 12, are formed of a highly electrically resistive EPDM rubber composition and thus galvanic corrosion of the flange 12 can be prevented, and a light weather strip 1 can be obtained.

The weather strip 31 illustrated in FIG. 1B that is to be mounted to a roof has a mount base 32 having a substantially plate-like shape and inserted and held in the channel portion 15 made of a steel plate or an aluminum alloy plate, and a hollow sealing portion 33 that is to be in contact with a periphery protector 17 of a sunroof glass 16 for sealing the gap therebetween.

The mount base 32 and a portion of the hollow sealing portion 33 (hatched area) are formed of an EPDM rubber composition of examples 1 to 12, and the rest of the portions of the hollow sealing portion 33 are formed of a sponge rubber composition. The EPDM rubber composition and the sponge rubber composition are co-extruded to form the weather strip 31.

In this example, the mount base 32 and a portion of the hollow sealing portion 33, both to be in contact with the channel portion 15, are formed of a highly electrically resistive EPDM rubber composition and thus galvanic corrosion of the channel portion 15 can be prevented, and a light weather strip 31 can be obtained.

The present invention is not limited to the examples described above, and may be modified as appropriate and embodied without departing from the scope of the present invention.

The invention claimed is:

1. A weather strip, comprising:
a mount base, which is to be mounted to a car body, wherein
the mount base of the weather strip is formed of a rubber composition in a vulcanized state having a volume resistivity of no less than 1.0E+6 Ω·cm and a specific gravity of less than 1.30,
the rubber composition in an unvulcanized state including:
ethylene-α-olefin-nonconjugated diene copolymer in an amount of 100 parts by mass;
carbon black in an amount of 40 parts by mass to 140 parts by mass; and
at least one first polymer having a specific gravity of no more than 1.8 and an ethylene content of no more than 70 wt % and at least one second polymer having a specific gravity of no more than 1.8 and an ethylene content of no less than 70 wt % in a collective amount of 5 parts by mass to 50 parts by mass, wherein the first polymer is an ethylene propylene rubber having no double bond derived from a nonconjugated diene, which is a cross-linking site, the ethylene propylene rubber is included in an amount of no less than 0.5 part by mass per 100 parts by mass of the ethylene-α-olefin-nonconjugated diene copolymer, the second polymer is an ethylene-α-olefin copolymer having no double bond derived from a nonconjugated diene, which is a cross-linking site, and the ethylene-α-olefin copolymer is included in an amount of no less than 0.5 part by mass per 100 parts by mass of the ethylene-α-olefin-nonconjugated diene copolymer.

2. The weather strip according to claim 1, wherein the ethylene-α-olefin copolymer is selected from the group consisting of ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, and ethylene-1-butene-1-octene copolymer.

3. A composition for a weather strip, comprising:

a rubber composition in a vulcanized state having a volume resistivity of no less than 1.0E+6 Ω·cm and a specific gravity of less than 1.30, the rubber composition in an unvulcanized state including:

ethylene-α-olefin-nonconjugated diene copolymer in an amount of 100 parts by mass;

carbon black in an amount of 40 parts by mass to 140 parts by mass; and at least one first polymer having a specific gravity of no more than 1.8 and an ethylene content of no more than 70 wt % and at least one second polymer having a specific gravity of no more than 1.8 and an ethylene content of no less than 70 wt % in a collective amount of 5 parts by mass to 50 parts by mass, wherein the first polymer is an ethylene propylene rubber having no double bond derived from a nonconjugated diene, which is a cross-linking site, the ethylene propylene rubber is included in an amount of no less than 0.5 part by mass per 100 parts by mass of the ethylene-α-olefin-nonconjugated diene copolymer, the second polymer is an ethylene-α-olefin copolymer having no double bond derived from a nonconjugated diene, which is a cross-linking site, and the ethylene-α-olefin copolymer is included in an amount of no less than 0.5 part by mass per 100 parts by mass of the ethylene-α-olefin-nonconjugated diene copolymer.

4. The composition according to claim 3, wherein the ethylene-α-olefin copolymer is selected from the group consisting of ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, and ethylene-1-butene-1-octene copolymer.

* * * * *